US 11,562,043 B1
Jan. 24, 2023

(12) United States Patent
Cournoyer et al.

(54) SYSTEM AND METHOD FOR RENDERING WEBPAGE CODE TO DYNAMICALLY DISABLE AN ELEMENT OF TEMPLATE CODE

(71) Applicant: SHOPIFY INC., Ottawa (CA)

(72) Inventors: Marc-André Cournoyer, Montréal (CA); Melissa Luu, Toronto (CA); Ershad Rahimikia, Toronto (CA); Javier Arturo Moreno Camargo, Toronto (CA); Erin Wild, Milton (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/514,520

(22) Filed: Oct. 29, 2021

(51) Int. Cl.
G06F 17/10 (2006.01)
G06F 16/957 (2019.01)
G06F 40/205 (2020.01)
G06F 40/186 (2020.01)
G06F 16/958 (2019.01)

(52) U.S. Cl.
CPC ........ *G06F 16/9577* (2019.01); *G06F 16/972* (2019.01); *G06F 40/186* (2020.01); *G06F 40/205* (2020.01)

(58) Field of Classification Search
CPC ............... G06F 16/9577; G06F 16/972; G06F 40/186; G06F 40/205
See application file for complete search history.

(56) References Cited

U.S. PATENT DOCUMENTS

| 6,052,803 A * | 4/2000 | Bhatia ...................... H04L 9/40 714/49 |
| 6,253,367 B1 * | 6/2001 | Tran ...................... G06F 16/972 707/E17.117 |
| 6,266,681 B1 * | 7/2001 | Guthrie .................... G06F 9/451 707/999.01 |
| 6,990,629 B1 * | 1/2006 | Heaney .................. G06Q 10/10 707/999.102 |
| 7,030,890 B1 * | 4/2006 | Jouet ....................... G06F 9/451 345/589 |
| 7,047,318 B1 * | 5/2006 | Svedloff ............... G06F 16/958 709/213 |
| 7,089,330 B1 * | 8/2006 | Mason .................. G06F 16/972 707/999.005 |
| 7,548,957 B1 * | 6/2009 | Wichmann ............ G06F 16/972 709/219 |
| 7,904,502 B2 * | 3/2011 | Wolff ........................ H04L 9/40 709/219 |

(Continued)

FOREIGN PATENT DOCUMENTS

| CN | 108701057 A * | 10/2018 | ........... G06F 16/173 |
| EP | 1793317 A2 * | 6/2007 | ........... G06F 16/986 |

(Continued)

*Primary Examiner* — Shahid K Khan
(74) *Attorney, Agent, or Firm* — Ridout & Maybee LLP

(57) ABSTRACT

The present disclosure provides a system and method for dynamically disabling identified elements in template code transforming into webpage code for rendering. The method comprises: in response to a first request to render a webpage from a template file associated with a service instance, identifying a first code unit in the template file that is associated with a first application that is not included in a set of one or more installed applications registered with the service instance; transforming the template file into a webpage file containing webpage code, wherein the transforming disables the first code unit; and providing the webpage file to an electronic device for rendering the webpage from the webpage file, wherein the first code unit has been disabled.

22 Claims, 8 Drawing Sheets

(56) References Cited

U.S. PATENT DOCUMENTS

| | | | |
|---|---|---|---|
| 8,195,531 B2* | 6/2012 | Bell | G06Q 30/0207 705/26.1 |
| 8,522,228 B1* | 8/2013 | Le | G06F 8/61 717/171 |
| 8,554,792 B1* | 10/2013 | Ahmed | G06F 16/9577 455/432.1 |
| 8,566,704 B1* | 10/2013 | Le Bescond de Coatpont | G01N 21/6428 715/234 |
| 8,689,117 B1* | 4/2014 | Vasilik | G06F 16/9577 715/229 |
| 9,135,364 B1* | 9/2015 | Sundaram | G06F 16/972 |
| 10,305,758 B1* | 5/2019 | Bhide | G06F 11/3466 |
| 10,318,265 B1* | 6/2019 | To | H04L 67/34 |
| 2001/0032216 A1* | 10/2001 | Duxbury | G06F 40/166 715/255 |
| 2002/0073125 A1* | 6/2002 | Bier | G06F 40/166 715/255 |
| 2002/0085025 A1* | 7/2002 | Busis | G06Q 30/06 715/738 |
| 2002/0103856 A1* | 8/2002 | Hewett | H04L 69/329 709/219 |
| 2002/0103876 A1* | 8/2002 | Chatani | G06F 16/951 709/217 |
| 2003/0158953 A1* | 8/2003 | Lal | H04L 69/40 709/218 |
| 2004/0044731 A1* | 3/2004 | Chen | H04L 67/568 709/203 |
| 2004/0133660 A1* | 7/2004 | Junghuber | G06F 16/958 715/255 |
| 2005/0021694 A1* | 1/2005 | Yuan | G06F 16/954 707/E17.117 |
| 2005/0028080 A1* | 2/2005 | Challenger | G06F 40/143 715/205 |
| 2005/0055634 A1* | 3/2005 | Burns | G06F 16/972 715/251 |
| 2005/0055635 A1* | 3/2005 | Bargeron | G06F 40/103 715/251 |
| 2005/0091224 A1* | 4/2005 | Fisher | G06F 40/177 |
| 2005/0204281 A1* | 9/2005 | Choate | G06F 40/143 705/26.1 |
| 2006/0015846 A1* | 1/2006 | Fraleigh | G06F 3/0481 717/109 |
| 2006/0136809 A1* | 6/2006 | Fernstrom | G06F 40/186 715/255 |
| 2007/0033612 A1* | 2/2007 | Lerman | H04N 21/4312 348/E7.071 |
| 2007/0220419 A1* | 9/2007 | Stibel | G06F 16/958 707/E17.116 |
| 2007/0283273 A1* | 12/2007 | Woods | G06F 16/95 715/738 |
| 2008/0077851 A1* | 3/2008 | Hesmer | G06F 9/451 715/205 |
| 2008/0098028 A1* | 4/2008 | Shan | G06F 16/972 707/999.102 |
| 2008/0104501 A1* | 5/2008 | Sattler | G06F 40/186 715/224 |
| 2008/0295164 A1* | 11/2008 | Steiner | H04L 63/10 726/14 |
| 2009/0031225 A1* | 1/2009 | Toebes | G06F 16/972 715/760 |
| 2009/0063502 A1* | 3/2009 | Coimbatore | G06F 16/972 |
| 2009/0070752 A1* | 3/2009 | Alpern | G06F 8/63 717/148 |
| 2009/0172005 A1* | 7/2009 | LaToza | G06F 40/186 707/999.102 |
| 2009/0199047 A1* | 8/2009 | Vaitheeswaran | G06F 11/3672 714/E11.179 |
| 2009/0276764 A1* | 11/2009 | Ghorbani | G06F 16/958 717/148 |
| 2010/0064229 A1* | 3/2010 | Lau | G06F 16/972 715/744 |
| 2010/0217772 A1* | 8/2010 | Uppala | G06Q 10/06 707/769 |
| 2011/0016528 A1* | 1/2011 | Zhou | H04L 41/0677 726/23 |
| 2011/0179176 A1* | 7/2011 | Ravichandran | G06Q 30/02 709/226 |
| 2011/0296391 A1* | 12/2011 | Gass | G06F 8/72 717/168 |
| 2012/0047239 A1* | 2/2012 | Donahue | G06F 9/5072 709/220 |
| 2012/0210205 A1* | 8/2012 | Sherwood | H04N 21/6175 715/234 |
| 2012/0254203 A1* | 10/2012 | Stewart | G06F 21/6209 707/E17.058 |
| 2012/0278229 A1* | 11/2012 | Vishwanathan | G06Q 20/14 705/40 |
| 2012/0323940 A1* | 12/2012 | Davis | H04L 67/06 707/756 |
| 2013/0061209 A1* | 3/2013 | Lam | G06F 11/3664 717/123 |
| 2013/0073401 A1* | 3/2013 | Cook | G06Q 30/0277 705/14.73 |
| 2013/0117656 A1* | 5/2013 | Verlaan | G06F 40/186 715/234 |
| 2013/0117657 A1* | 5/2013 | Verlaan | G06F 40/186 715/234 |
| 2014/0032480 A1* | 1/2014 | Lesage | G06F 40/14 707/E17.039 |
| 2014/0075021 A1* | 3/2014 | Revanuru | H04L 41/5041 709/224 |
| 2014/0075437 A1* | 3/2014 | Mousseau | G06F 9/467 718/1 |
| 2014/0082155 A1* | 3/2014 | Abrams | G06F 16/24578 709/220 |
| 2014/0237351 A1* | 8/2014 | Seidl | H04L 67/02 715/234 |
| 2015/0046789 A1* | 2/2015 | Wei | G06F 40/14 715/234 |
| 2015/0046791 A1* | 2/2015 | Isaacson | G06F 40/146 715/234 |
| 2015/0095767 A1* | 4/2015 | Ebner | G06F 9/451 715/238 |
| 2015/0242528 A1* | 8/2015 | Buehler | H04L 67/02 707/736 |
| 2016/0088023 A1* | 3/2016 | Handa | H04L 67/02 709/219 |
| 2016/0127444 A1* | 5/2016 | Singh | H04L 67/02 709/203 |
| 2016/0224909 A1* | 8/2016 | Garrard | G06F 40/186 |
| 2016/0226900 A1* | 8/2016 | Fajardo Verano | G06F 21/562 |
| 2016/0274927 A1* | 9/2016 | Savant | G06F 9/45558 |
| 2016/0366246 A1* | 12/2016 | Battle | G06F 9/5055 |
| 2017/0139659 A1* | 5/2017 | Spriggs | G06F 9/451 |
| 2017/0163752 A1* | 6/2017 | Kaledhonkar | H04L 67/306 |
| 2017/0300497 A1* | 10/2017 | Pan | H04L 41/50 |
| 2018/0032627 A1* | 2/2018 | Margatan | H04L 67/535 |
| 2018/0167270 A1* | 6/2018 | Carbone | H04L 41/5041 |
| 2018/0248758 A1* | 8/2018 | Ali | H04L 41/0677 |
| 2018/0287865 A1* | 10/2018 | Gorelik | H04L 67/34 |
| 2019/0028531 A1* | 1/2019 | Nagar | G06F 16/955 |
| 2019/0163448 A1* | 5/2019 | Essenmacher | G06F 8/35 |
| 2019/0347181 A1* | 11/2019 | Cranfill | G06F 21/629 |
| 2020/0143016 A1* | 5/2020 | Borkar | G06F 21/10 |
| 2020/0351176 A1* | 11/2020 | Venkiteswaran | G06F 16/953 |
| 2021/0208916 A1* | 7/2021 | Wang | G06F 9/45558 |
| 2022/0014603 A1* | 1/2022 | Cameron | H04L 67/55 |

FOREIGN PATENT DOCUMENTS

| | | | | |
|---|---|---|---|---|
| WO | WO-9845793 A1 | * | 10/1998 | G06F 9/4443 |
| WO | WO-2007111609 A1 | * | 10/2007 | G06F 17/2247 |
| WO | WO-2007124365 A2 | * | 11/2007 | G06Q 30/02 |

* cited by examiner

FIG. 2

SYSTEM AND METHOD FOR RENDERING WEBPAGE CODE TO DYNAMICALLY DISABLE AN ELEMENT OF TEMPLATE CODE

FIELD

The present disclosure is related to rendering a webpage from webpage code and template code. In particular, the present disclosure is related to dynamically disabling identified elements in the template code when transforming into the webpage code.

BACKGROUND

An e-commerce platform typically hosts many different online stores/service instance, providing services and functionalities to support typical operations of the online stores. In this sense, the e-commerce platform may play the role of a software as a service (SaaS) platform, and each online store may be a service instance on the platform.

Different online stores may have different preferences in terms of the look and feel of its webpage. A template file, which may be stored and maintained on the platform, includes code that defines that look and feel (or "theme") of the webpage for a service instance (e.g., online store), as well as content of the webpage. The template file contains template code that has a syntax different from webpage code in a webpage file (e.g., HTML code). In particular, in order to render a webpage (so as to be displayed on a user device by web browser), the template file must be transformed or converted into a webpage file, and the webpage file is then rendered into a webpage by the web browser engine.

Often, the template file may be editable (such as having code units inserted into the template code) by third-party service providers. For example, when a third-party application is installed for the service instance, a code unit (such as a line of code that is a call to load or include a code snippet, or the code snippet itself) may be automatically inserted into the template file. While the service instance owner may be aware of the desired change in their user interface, they may not be aware of if, when, and how any code is inserted into the template file.

SUMMARY

In various examples, the present disclosure describes methods and systems for dynamically transforming webpage code (e.g., in HTML) from source or template code, at the time that the webpage is to be rendered from the webpage code. In particular, identified element(s) of the template code are dynamically and reversibly disabled when creating the transformed webpage code.

In some examples, the present disclosure describes a system including a processing unit configured to execute instructions to cause the system to: in response to a first request to render a webpage from a template file associated with a service instance, identify a first code unit in the template file that is associated with a first application that is not included in a set of one or more installed applications registered with the service instance; transform the template file into a webpage file containing webpage code, wherein the transforming disables the first code unit; and providing the webpage file to an electronic device to cause the electronic device to render the webpage from the webpage file, wherein the first code unit has been disabled.

In some examples, the present disclosure describes a method including: in response to a first request to render a webpage from a template file associated with a service instance, identifying a first code unit in the template file that is associated with a first application that is not included in a set of one or more installed applications registered with the service instance; transforming the template file into a webpage file containing webpage code, the transforming disabling the first code unit; and providing the webpage file to an electronic device to cause the electronic device to render the webpage from the webpage file; wherein the first code unit has been disabled.

In some examples, the present disclosure describes a computer-readable medium storing instructions that, when executed by a processor of a system, cause the system to: in response to a first request to render a webpage from a template file associated with a service instance, identify a first code unit in the template file that is associated with a first application that is not included in a set of one or more installed applications registered with the service instance; transform the template file into a webpage file containing webpage code, wherein the transforming disables the first code unit; and provide the webpage file to an electronic device to cause the electronic device to render the webpage from the webpage file, wherein the first code unit has been disabled.

In any of the above examples, the template code contained in the template file may be parsed to identify one or more code units in the template file, the first code unit being further identified from the one or more code units.

In any of the above examples, the first code unit may be identified using a code unit map.

In any of the above examples, identifying the first code unit may further comprise determining, using the code unit map, that the first application is associated with a service provider that is not associated with any installed application registered with the service instance.

In any of the above examples, a platform application register of installable applications may be maintained; in response to a request to add a second application to the platform application register, a second code unit associated with the second application may be identified; the code unit map may be updated to include an entry including identification of the second code unit in association with the second application; and the platform application register may be updated with the second application.

In any of the above examples, the code unit map may be generated by: parsing a plurality of template files associated with a respective plurality of service instances, to identify sets of code units associated with service instances; determining sets of installed applications associated with service instances; determining, based on correlation between the sets of code units and the sets of installed applications associated with the service instances, associations between identified code units and installed applications; and for the determined associations, generating entries in the code unit map identifying the identified code units associated with the installed applications.

In any of the above examples, code units with a low correlation with the sets of installed applications associated with the service instances may be identified; and entries in the code unit map identifying the code units with low correlation with the installed applications may be generated.

In any of the above examples, the code unit map may be generated by: installing applications in an isolated test environment; identifying sets of code units associated with the applications based on how code in a test template file is affected by installation of the applications; and generating entries in the code unit map identifying the identified code units associated with the installed applications.

In any of the above examples, wherein the template file is transformed into the webpage file by at least one of: transforming the first code unit into non-functioning webpage code in the webpage file; or omitting any webpage code corresponding to the first code unit from the webpage file.

In any of the above examples, wherein the first code unit may be transformed into non-functioning webpage code by at least one of: transforming the first code unit into a comment in the webpage file, the comment including an indication of the first code unit, wherein the comment is not rendered into the webpage; or replacing the first code unit with a generic comment that the first code unit was not transformed into the webpage file, wherein the generic comment is not rendered on the webpage.

In any of the above examples, the indication of the first code unit may be one or more of an explicit identification of the first code unit, an identification of the associated application, and an identification of the associated service provider.

In any of the above examples, in response to a second request, subsequent to the first request, to render the webpage from the template file, identify the first code unit in the template file; determine, using the code unit map, that the first code unit is associated with the first application, and further determining that the first application has been installed with the service instance subsequent to the first request; transform the template file into a second webpage file, wherein the first code unit is transformed into renderable webpage code; and providing the second webpage file to the electronic device to cause the electronic device to render a second webpage from the second webpage file, including rendering the webpage code associated with the first code unit.

BRIEF DESCRIPTION OF THE DRAWINGS

Reference will now be made, by way of example, to the accompanying drawings which show example embodiments of the present application, and in which:

FIG. 2 is an example homepage of an administrator, which may be accessed via the e-commerce platform of FIG. 1;

Similar reference numerals may have been used in different figures to denote similar components.

DESCRIPTION OF EXAMPLE EMBODIMENTS

The present disclosure includes examples in which an e-commerce platform acts as a SaaS platform that supports a plurality of service instances, each service instance being an online store. As such, an example of an e-commerce platform is described below. However, it should be understood that this discussion is only for the purpose of illustration of an example e-commerce platform and is not intended to be limiting as to the nature of an e-commerce system with which the subject matter of the present application may be implemented. Further, it should be understood that the present disclosure may be implemented in other contexts, and is not necessarily limited to implementation in an e-commerce platform. For example, the present disclosure may be implemented in the context of any other platform that supports service instances (e.g., a web hosting platform), without necessarily supporting any e-commerce. Other such possibilities are contemplated within the scope of the present disclosure.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
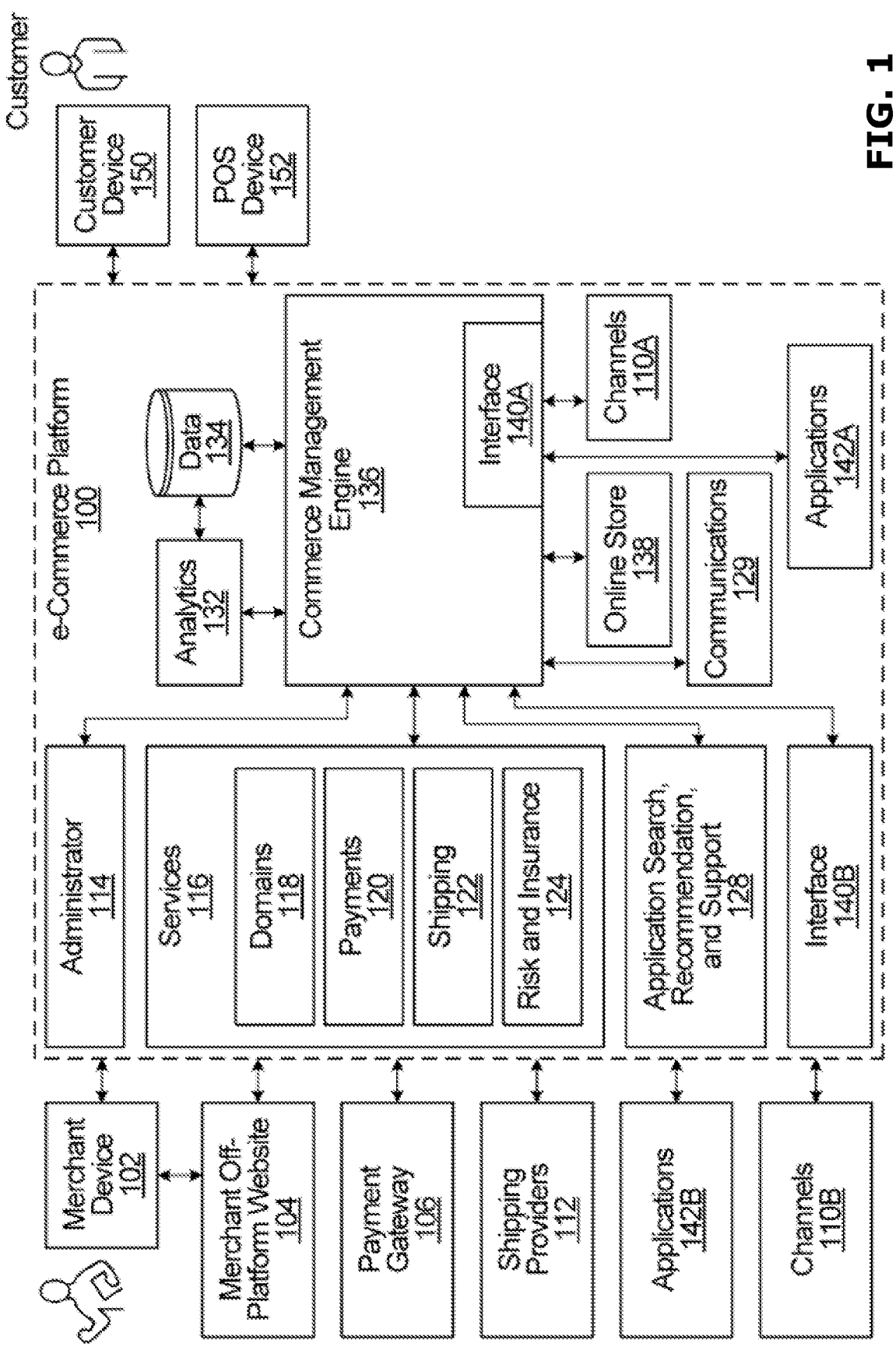
FIG. 1 is a block diagram of an example e-commerce platform, in which examples described herein may be implemented.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

Figure 3:
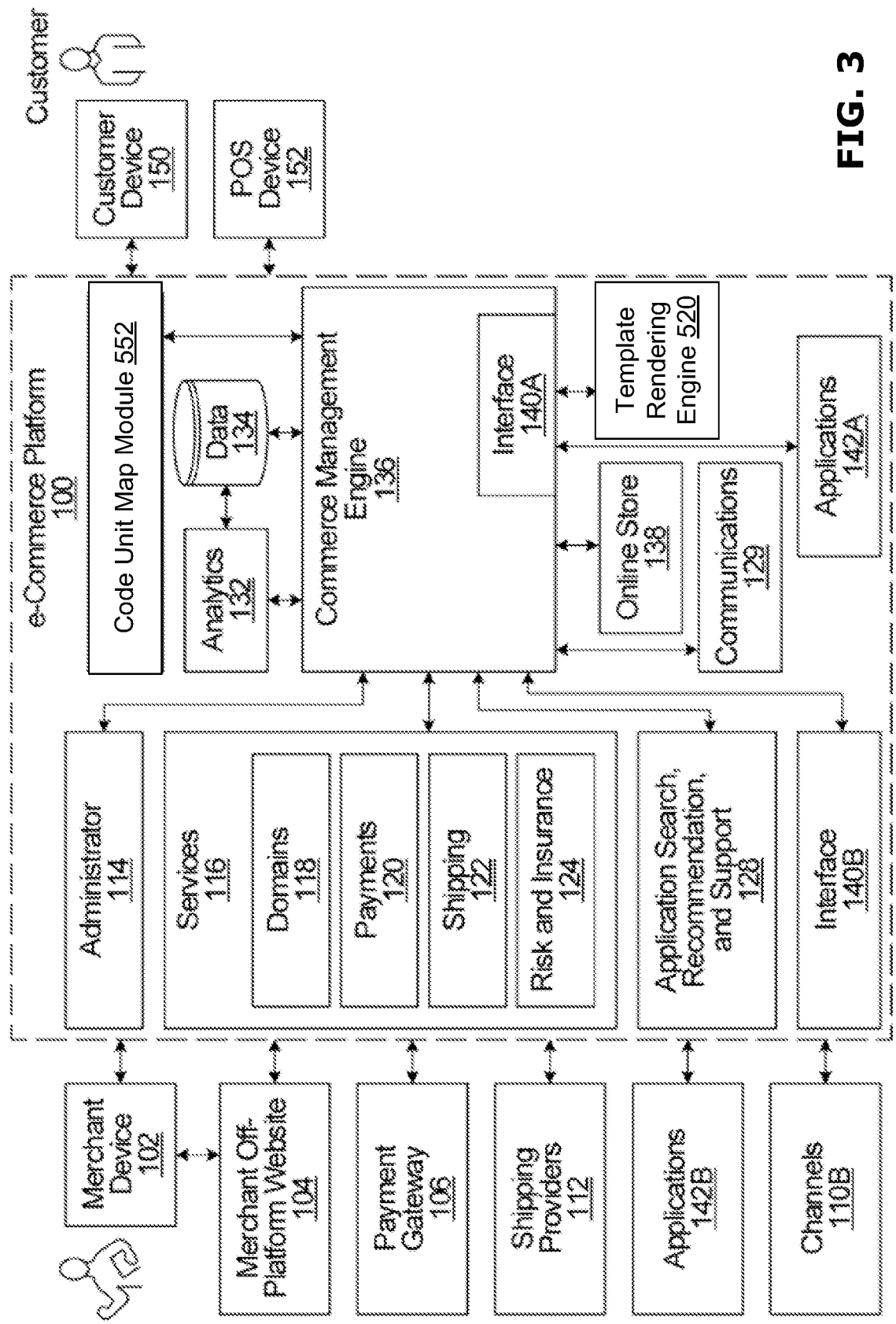
FIG. 3 is another block diagram of the e-commerce platform of FIG. 1, showing some details related to code unit management.

In the examples of FIGS. 1 and 3, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
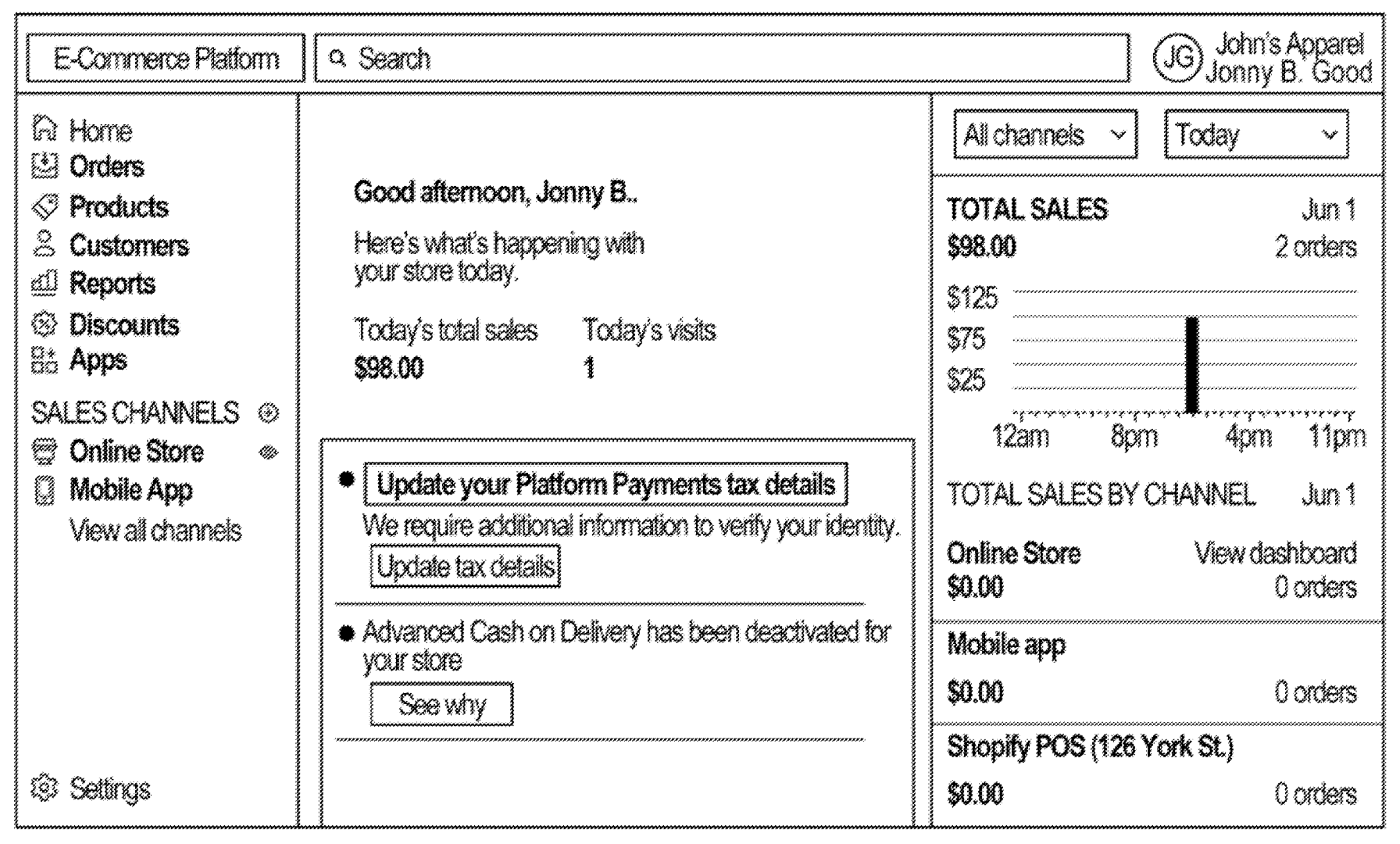

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The payment facility 120 may also provide merchants and buyers with financial support, such as through the lending of capital (e.g., lending funds, cash advances, and the like) and provision of insurance. In some embodiments, online store 138 may support a number of independently administered storefronts and process a large volume of customer data on a daily basis for a variety of products and services. The customer data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and customers as more merchants and customers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for customers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 4:
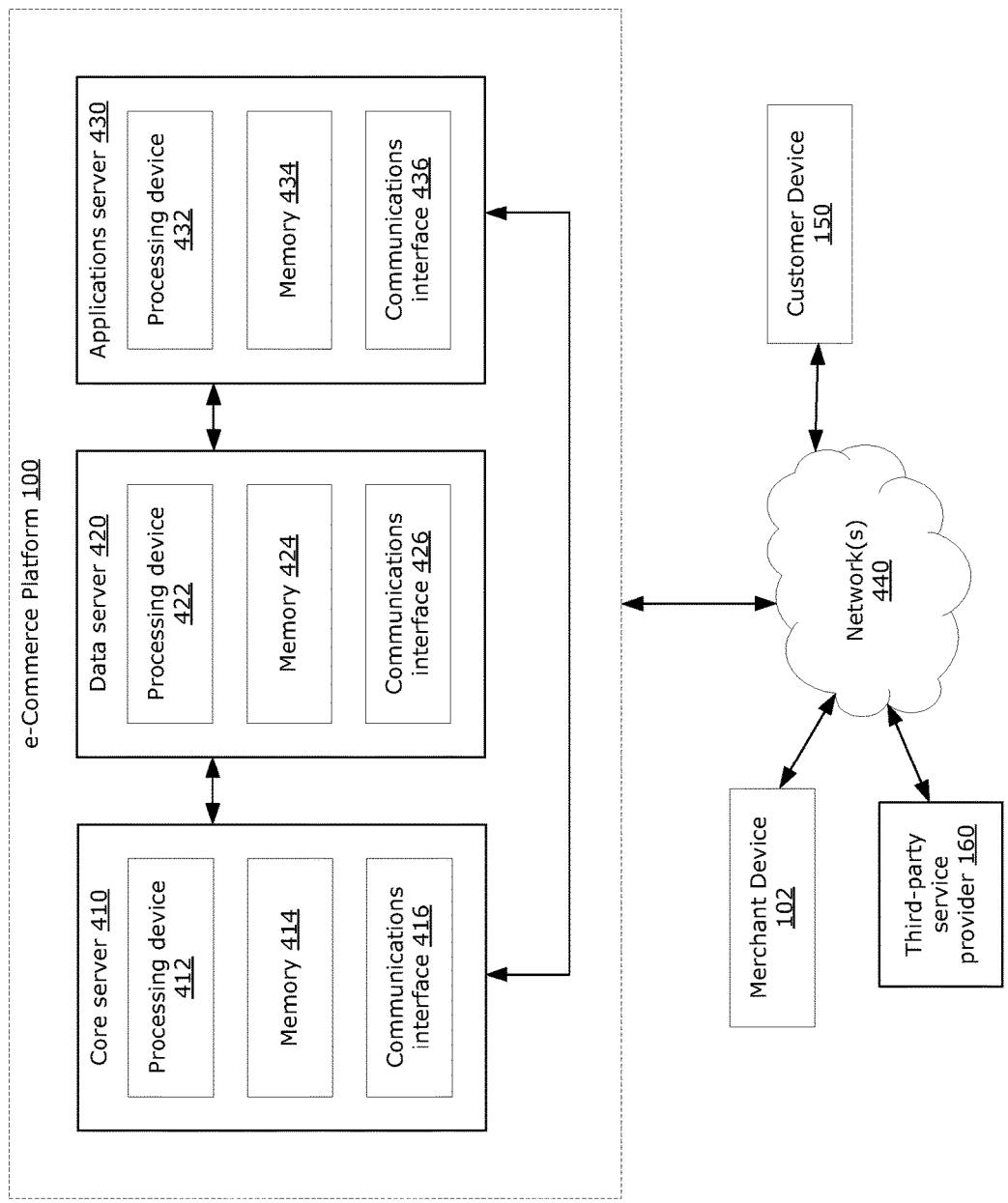
FIG. 4 is a block diagram illustrating an example implementation of the e-commerce platform of FIG. 1.

FIG. 4 is a block diagram of an example hardware configuration of the e-commerce platform 100 in communication with a multiple merchant devices 102 and a customer device 150.

It should be noted that different components of the e-commerce platform 100 (e.g., the data facility 134, analytics 132, commerce management engine 136 and applications 142A-B) may be implemented in separate hardware or software components, on a common hardware component or server or configured as a common (integrated) service or engine in the e-commerce platform 100. In the example of FIG. 4, the e-commerce platform 100 includes a core server 410, a data server 420 and an applications server 430, which are each in communication with each other (e.g., via wired connections and/or via wireless intranet connections). Each of the servers 410, 420, 430 include a respective processing device 412, 422, 432 (each of which may be, for example, a microprocessor, graphical processing unit, digital signal processor or other computational element), a respective memory 414, 424, 434 (each of which may be, for example, random access memory (RAM), read only memory (ROM), hard disk, optical disc, subscriber identity module (SIM) card, memory stick, secure digital (SD) memory card, and the like, and may include tangible or transient memory), and a respective communications interface 416, 426, 436 (each of which may include transmitter, receiver and/or transceiver for wired and/or wireless communications). The core server 410 may store instructions and perform operations relevant to core capabilities of the e-commerce platform, such as providing the administrator 114, analytics 132, commerce management engine 136, services 116, and/or payment facility 120, among others. The data server 420 may be used to implement the data facility 134, among others. The applications server 430 may store instructions and perform operations relevant to the applications 142A-B, such as storing instructions and data for the applications 142A-B and for implementing application search, recommendation and support 128.

Merchants and customers, using respective devices 102 and 150 may access the e-commerce platform 100 via one or more networks 440 (e.g., wired and/or wireless networks, including a virtual private network (VPN), the Internet, and the like).

Although FIG. 4 illustrates an example hardware implementation of the e-commerce platform 100, it should be understood that other implementations may be possible. For example, there may be greater or fewer numbers of servers, the e-commerce platform 100 may be implemented in a distributed manner, or at least some of the memories 414, 424, 434 may be replaced with external storage or cloud-based storage, among other possible modifications.

Figure 5:
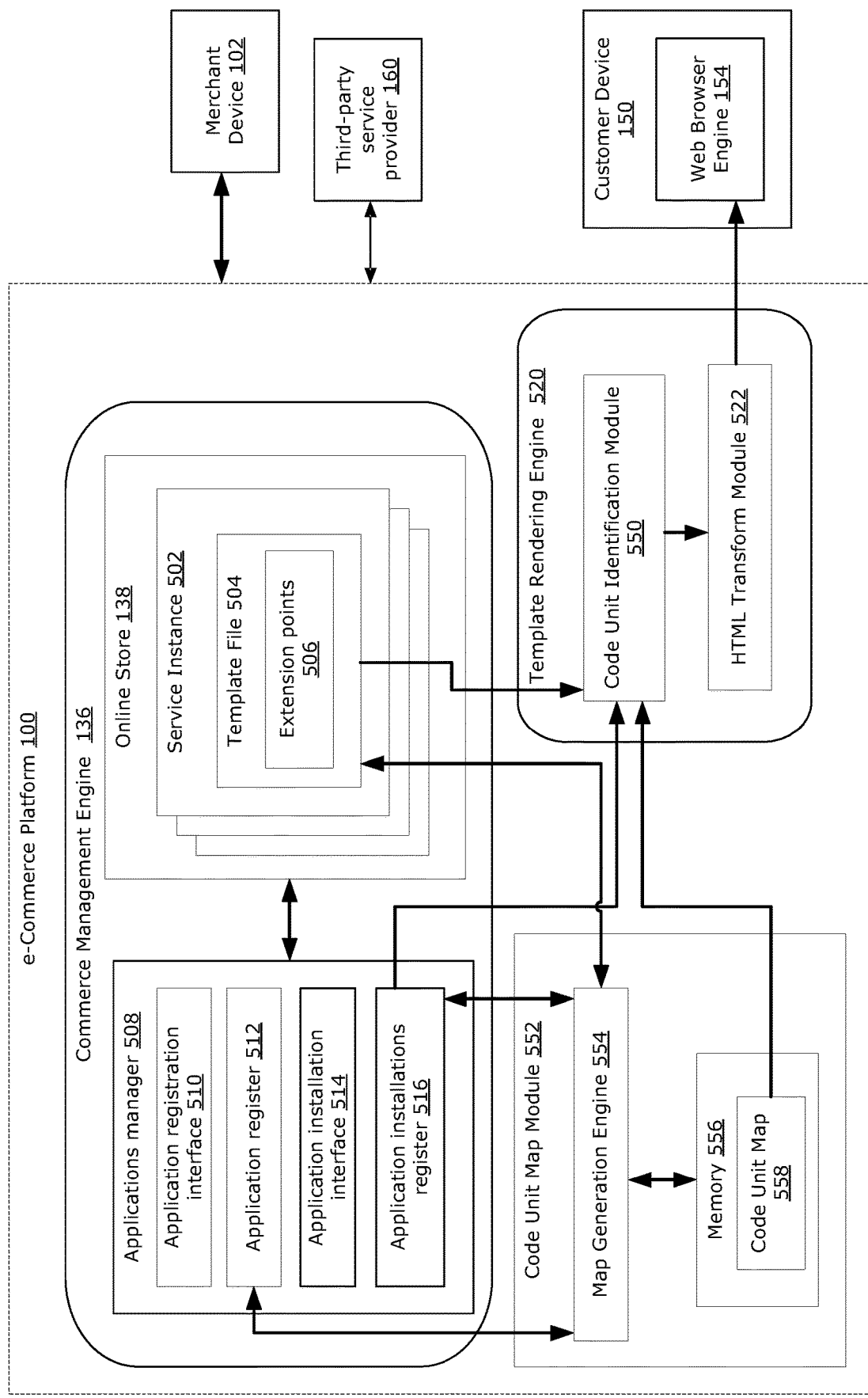
FIG. 5 is another block diagram of the e-commerce platform of FIG. 1, showing details related to identifying and disabling code units in template code of service instances.

FIG. 5 is another depiction of the e-commerce platform 100 that omits some details that have been described with reference to FIG. 1, and shows further details discussed below. In particular, FIG. 5 illustrates some example details of the e-commerce platform 100 that are relevant to its role as a SaaS platform, and particularly to dynamically transforming template code to webpage code with certain code units of the template code that have been dynamically disabled.

Online stores 138 hosted on the e-commerce platform 100 may be implemented as service instances 502, each service instance being a set of functionality provided by the e-commerce platform 100 to a client (e.g., a merchant) of the e-commerce platform 100. A merchant may be associated with multiple service instances 502 (each corresponding to a respective online store 138, for example). Each service instance 502 may be identified by a respective service instance ID, which may be unique at least within the e-commerce platform 100.

Each service instance 502 comprises executable code or a template file 504 that implements the service instances 502 and that includes one or more extension points 506. Extension points 506 are defined inside the e-commerce platform 100 to allow the customization of functionality of the e-commerce platform 100, and more specifically the service instances 502 (e.g., the online stores 138). Briefly, an extension point 506 defined in a service instance 502 enables connection to an application to provide a functionality that extends the overall functionality of the service instance 502. Each extension point 506 may have a specified format that includes defined inputs and outputs, and may be uniquely identified (at least within the e-commerce platform 100) using an extension point ID. An application may be developed to meet the defined inputs and outputs of an extension point 506, without having any further knowledge about the service instance 502. Similarly, a service instance 202 may make use of an application without having knowledge of the operation of that application, except the defined inputs and outputs at the extension point 506 connecting to that application. The use of extension points 506 thus enables modular customization of functionalities at a service instance 502.

The e-commerce platform 100 also includes an application manager 508, which may be used to manage applications that may be registered with the e-commerce platform 100. In the illustrated example, the application manager 508 includes an application registration interface 510 for registering an application with the e-commerce platform 100. For example, a third-party service provider 160 may register a third-party application 142B with the e-commerce platform 100 using the application registration interface 510. First-party applications 142A, which may be native to the e-commerce platform 100 (or developed by an operator of the e-commerce platform 100) may be automatically registered with the e-commerce platform 100 without having to use the application registration interface 510. The application manager 508 also includes a platform application register 512, which is a list of applications that are registered with the e-commerce platform 100 and are installable by the service instance 502. The platform application register 512 associates each registered application with a unique application ID. The application manager 508 includes an application installation interface 514 that may be used to select a registered application to be installed against a given service instance 502. The application installation interface 514 may be part of or accessible via a merchant user interface (e.g., via the administrator 114). For example, a home page for managing an online store 138 may be used to access the application installation interface 514, in order to select one or more registered applications to install for the online store 138. The application manager 508 also includes a service instance application register 516, which stores and maintains an indication of which application(s) are installed on (or registered against) each service instance 502.

A third-party service provider 160 may develop applications which may be used on the e-commerce platform 100. The third-party service provider 160 may register third-party applications using the application registration interface 510. After a third-party application is registered, the platform application register 512 is updated to include an application ID (which is unique to the application, at least within the e-commerce platform 100) to indicate the application has been registered. A first-party application may be automatically included in the platform application register 512 after the application is developed and deployed by the operator of the e-commerce platform 100. After an application is registered with the platform 100 (and is included in the platform application register 512), the registered application is available for installation (or registration) against a service instance 502. For example, through the application installation interface 514, a merchant can select a given registered application to be installed against the merchant's service instance 502 (e.g., the online store associated with the merchant). After the given application has been successfully installed against the merchant's service instance 502, the service instance application register 516 is updated to indicate that the given application has been installed for that service instance 502 (e.g., the service instance application register 516 may record the application ID of the given application in association with a service instance ID of the service instance 502).

Each service instance 502 has a template file 504 that includes template code that helps to create the look and feel (such as the theme) of a webpage provided by the service instance 502 and/or the content of the webpage. If there are multiple webpages provided by the service instance 502, the template file 504 may be used for all webpages of the service instance 502. Alternatively, each webpage may have its own template file 504. When an application by a third-party service provider has been installed for that service instance 502, code units (e.g., a line of code that includes a call to insert a code snippet; or one or more lines of code that form a code snippet) may be inserted into the template code of the template file 504 by the third-party service provider. A code snippet may refer to a small section of re-usable (and operative) source or machine code.

A problem may arise when the third-party application is subsequently uninstalled, because the uninstallation typically does not result in all of the inserted code units being removed from the template file 504. Moreover, for security reasons, API access to the application for the given service instance 502 is often revoked when the third-party application is uninstalled. Thus, even if an application sought to remove all of its code from the template file, it may not be able to.

In such cases, the inserted code unit that was not removed becomes a "ghost code unit" (i.e., a code unit that is functional, but no longer serves any purpose). Thus, when the template code in the template file 504 is transformed into webpage code, the ghost code unit is unnecessarily also transformed into webpage code, and is subsequently unnecessarily processed by the web browser engine 154 when the webpage is rendered.

Over time, the number of ghost code units in a template file 504 can be significant, and can consume significant computer resources (e.g., requiring processor power and memory to transform and render) as well as adding to latency (e.g., requiring additional time for the web browser engine to render).

The e-commerce platform 100 is further shown having a template rendering engine 520 with an HTML transform module 522. Typically, when a webpage is to be rendered (e.g., a user, such as a customer, navigates to the webpage in a browser), the template rendering engine 520 (not to be confused with the web browser engine 154 that renders the webpage on the user device) transforms the template file 504 (with the ghost code units) into a webpage file (such as with HTML code), such as through the HTML transform module 522. The webpage file is provided to a user or customer device 150 and the webpage file is then rendered into a webpage by the web browser engine 154 on the customer device 150.

However, as noted above, when the template code in the template file is transformed into webpage code, the ghost code unit(s) is/are unnecessarily also transformed into webpage code, and is/are subsequently unnecessarily processed by the web browser engine 154 when the webpage is rendered. Such unnecessary transformation and rendering can consume significant computer resources (e.g., requiring processor power and memory to transform and then render) as well as adding to latency (e.g., requiring additional time for the web browser engine 154 to render), both at the e-commerce platform 100 and at the user or customer device 150. This may be particularly problematic in the case where the user or customer device 150 has limited resources (e.g., is a handheld mobile device, which typically has fewer computer resources compared to desktop devices).

Although there are existing solutions that are able to optimize code by removing dead code, removal may not always be desirable. For example, if a previously uninstalled application is re-installed for the service instance 502, the third-party service provider 160 may assume that the previously inserted code unit is still present in the template file 504 and may not automatically insert that code unit again at re-installation. If the previously inserted code unit was removed from the template file 504 during the time that the application was uninstalled, then the application will not function after re-installation.

Thus, instead of removing the ghost code units from the template file 504, the e-commerce platform 100 is configured to disable the ghost code units when the webpage code is transformed from the template code. This may be accomplished whereby the transforming disables the ghost code units such that no corresponding webpage code/HTML is produced in the resulting webpage file. Alternatively, the transforming may disable the ghost code units such that only corresponding non-functioning webpage code/HTML is produced in the resulting webpage file (where non-functioning webpage code/HTML refers to code/HTML that is ignored or otherwise causes no rendering action when the webpage file is processed by the web browser engine 154 to render a webpage). Thus, when the webpage is rendered from the webpage code, either no webpage code that corresponds with the disabled ghost code units is present to be processed by the web browser engine 154, or non-functioning webpage code/HTML (that corresponds with the disabled ghost code units) is present, but is not processed by the web browser engine 154. Either way, the transforming disables the ghost code units and prevents their execution in the webpage (i.e. causes the webpage to be rendered without the web browser engine 154 having to process the ghost code units). In any case, the template code itself remains unchanged.

In that regard, if the ghost code unit(s) is needed again in the future (e.g., the previously uninstalled application is re-installed, or another application relies on the presence of the ghost code unit), the ghost code unit(s) can be enabled again.

In order to disable the ghost code units, the e-commerce platform 100 comprises a code unit identification module 550 which is configured to identify which code units in the template file 504 are ghost code units. As shown in FIG. 5, code unit identification module 550 may form part of the template rendering engine 520.

It is worth noting that template file 504 generally includes numerous code units associated with both internal applications 142A and external applications 142B, which may be distinct from the original template code. Code unit identification module 550 may be, thus, configured to parse the template code contained in the template file 504 in order to first identify the one or more code units associated with the applications 142A, 142B.

Inserted code units may be identifiable by unique strings (such as "include" instruction, "render" tag, ".liquid" extension etc.) In some cases, each code unit may be stored in a separate file. The separate file may be located in a specific or clearly-defined directory (i.e. each file in that directory is a code unit) that could be parsed by the code unit identification module 550.

In order to identify the ghost code units, the e-commerce platform 100 may further include a code unit map module 552. The code unit map module 552 is shown to comprise a map generation engine 554 and a memory 556. The map generation engine 554 is configured to generate a code unit map 558, which is stored in the memory 556.

Figure 8:
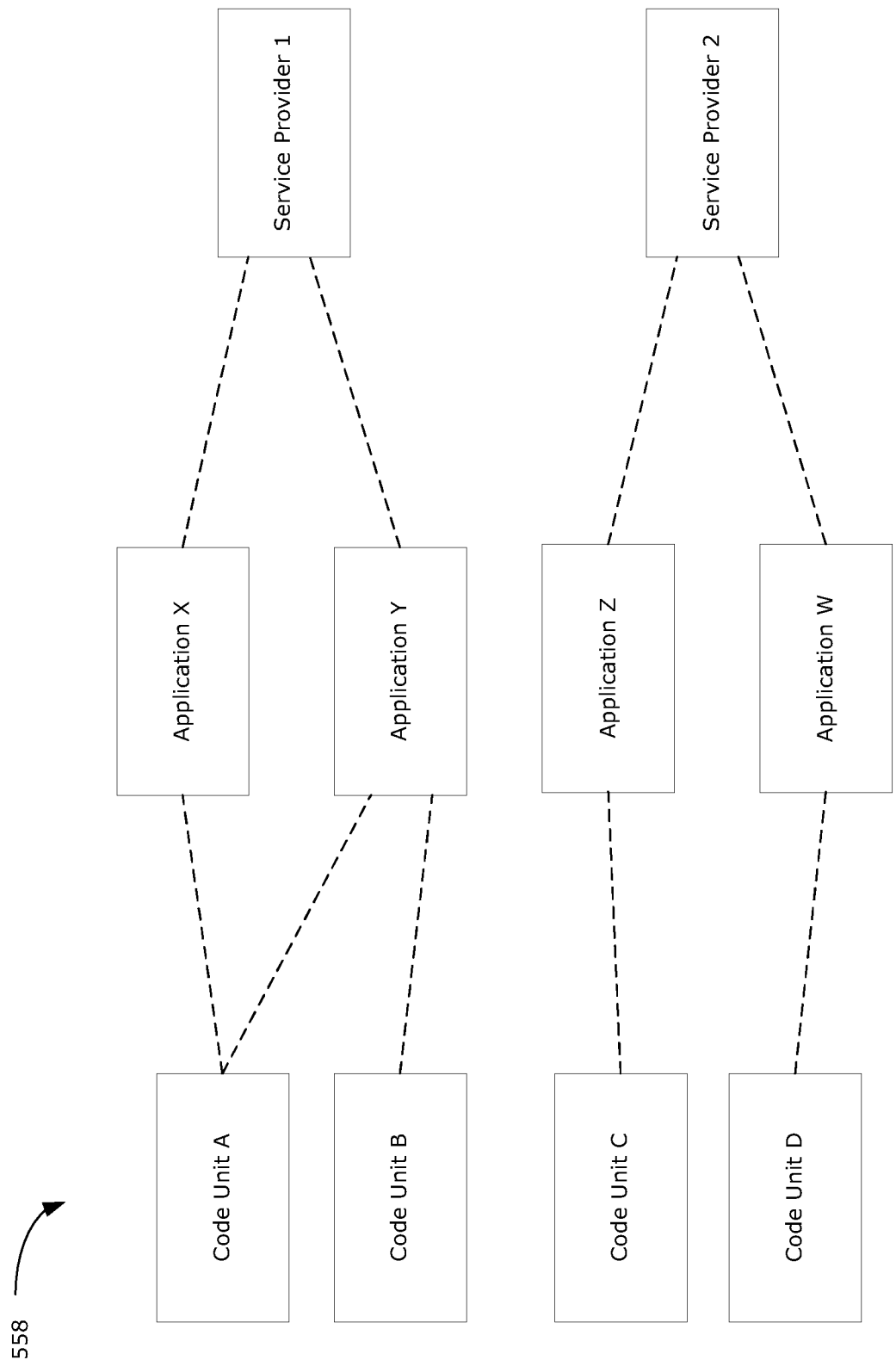
FIG. 8 is a simplified schematic illustration of a code unit map.

The code unit map 558 identifies the application and/or service provider that is associated with a given code unit. The code unit map 558 can be a look-up table or a hash table etc. For example, each code unit may be stored in the table as a hash instead of actual code, to save storage space. FIG. 8 is a simplified schematic illustration of an example code unit map 558. The code unit identification module 550 may reference the code unit map 558 in order to determine whether a given code unit in the template file 504 is associated with an application and/or service provider that is currently associated with the service instance 502 to which the template file 504 belongs. An application that is associated with the service instance 502 may be an application that is installed against the service instance 502. A service provider may be considered to be associated with the service instance 502 if there is any application belonging to the service provider that is installed against the service instance 502. If a given code unit is not associated with any application or service provider that is currently associated with the service instance 502, that given code unit is considered to be a ghost code unit.

Generation of the code unit map 558 is not trivial. Typically, a code unit does not explicitly indicate which application and/or service provider it is associated with. Further, association between installed applications and code units generally cannot be assumed simply by monitoring how a template file changes when applications are installed. For example, an application X may, upon installation, insert code units into the template file 504 that were copied from another template file, and hence may include ghost code units (from an application Y) that were also copied. In another example, ghost code units may be copied when template files are copied.

In that regard, the map generation engine 554 may be configured to generate the code unit map 558 in a number of ways. One approach to generating the code unit map 558 is to install applications in an isolated test environment (e.g., a "sandbox" environment), and observe how the code in a test template file is affected. Sets of code units that are associated with the applications based on how code in a test template file is affected by installation of the applications may be identified, and entries in the code unit map 558 may be generated. This may be part of standard procedure whenever a new application is registered on the e-commerce platform 100.

In that regard, each time an application is requested to be added to the platform application register 512, one or more code units associated with the that new application may be identified by the map generation engine 554 using the isolated test environment, and the code unit map 558 may be updated to include entry or entries that includes identification of the one or more new code units in association with the new application. The platform application register 512 would also then be updated by the map generation engine 554 to include the new application.

However, this approach may not be applicable for applications that are already registered on the e-commerce platform 100 and that have already been installed against the service instance 502.

Another approach is to analyze all (or a sampling of) service instances 502 on the e-commerce platform 100 to correlate or identify inserted code units in template files 504 of the service instances 502 with respective historical records of application installations from service instance application register 516. To that end, the map generation engine 554 may be configured to parse a plurality of template files 504 associated with a respective plurality of service instances 502, to identify sets of code units associated with the service instances 502. The map generation engine 554 may then be configured to determine sets of installed applications associated with service instances from the service instance application register 516. The map generation engine 554 may then determine, based on correlation between the sets of code units and the sets of installed applications associated with the service instances 502, associations between identified code units and installed applications, and for the determined associations, generate entries in the code unit map 558 identifying the identified code units associated with the installed applications, including the application's third-party service provider.

The associations between identified code units and installed applications may be based on the number of insertions of the identified code units into the template files 504 of the service instances 502 when the corresponding application was installed. The association between a code unit and an application may also be identified based on a high correlation with application installation. For example, if the code unit is found in certain template files 504, and the large majority (perhaps a predetermined threshold) of service instances 502 associated with those template files 504 also have a common application installed, then an association between the particular code unit(s) and the applications may be identified. In some cases, by extension, the association may be strengthened if the map generation engine 554 also determines that service instances 502 that do not have that application installed also do not have that code unit in the template file 504.

It is worth noting that the above mapping between code units and applications may not result in one to one entries. For example, there may be cases where multiple applications from the same third-party service provider 160 use the same or overlapping code units. The code unit map 558 would reflect such cross-associations.

Returning to the unit identification module 550, in order to identify ghost code units, the unit identification module 550 is in communication with the code unit map 558 and service instance application register 516. As described above, service instance application register 516 provides a record of, and identifies, the applications that have been installed for a given service instance 502. The service instance application register 516 may or may not also identify the service provider associated with each application (though associated the service provider and application may be identified in the code unit map 558).

Using the code unit map 558 and the service instance application register 516, the code unit identification module 550 may be configured to parse the template file 504 of the corresponding service instance 502 to identify code units in the template file 504 as described above, and to identify ghost code units from those code units. Ghost code units are code units that are not associated with at least one application that is currently installed for the corresponding service instance 502, and/or code units that are not associated with any service provider having at least one application currently installed for the service instance 502.

For example, if a particular code unit is associated with an application that is installed with the service instance 502, it would be considered (by the code unit identification module 550) to be a functional code unit, and thus, not a ghost code unit. If the particular code unit is associated with an application that is not installed with the service instance 502, it may be considered a ghost code unit. This determination is made at the application level.

However, the code unit identification module 550 may be further configured to consider the identity of the service provider of the associated application when determining whether a given code unit is a ghost code unit (i.e., determination may be made at the service provider level). For example, looking at FIG. 8, a template file 504 of a service instance 502 may include Code Unit A. If Code Unit A is associated with Application X that is not installed for the corresponding service instance 502, but Application X is associated with Service Provider 1, whose associated Application Y is installed for the service instance 502, then Code Unit A is not identified as a ghost code unit. In that regard, ghost code units may be identified on an application level and/or a service provider level, and the code unit map 558 may map code units to the application and/or to the service provider.

As noted above, the code unit identification module 550 may form part of the template rendering engine 520, and is in communication with HTML transform module 522. At the time that a webpage is to be rendered (e.g., a user, such as a customer, navigates to the webpage in a browser), the code unit identification module 550 in the template rendering engine 520 identifies the ghost code units in the template filed 504, based on the code unit map 558. The HTML transform module 522 is configured then to perform the transformation step.

In that regard, the HTML transform module 522 is configured to transform the template code in the template file 504 into webpage code, or HTML. This includes transforming the identified ghost code units in such a way so that they are omitted from the webpage code, or transformed into non-functioning webpage code, i.e. disabled when the template file 504 is transformed into the webpage code.

Disabling the ghost code unit(s) may be achieved by transforming the ghost code unit into non-functioning webpage code, such as placing the ghost code unit within comment tags in the webpage code (e.g., using <!——> tags in HTML), where the actual ghost code unit is unchanged within the comment tags. The ghost code unit may be transformed into a comment in the webpage file, where the comment includes an indication of the ghost code unit, and the comment is not rendered into the webpage. The indication may be an explicit identification of the code unit, an identification of the associated application and/or an identification of the associated service provider.

The ghost code unit may also be disabled by replacing the webpage code that would otherwise be transformed from the ghost code unit with a descriptive comment in the webpage code (e.g., descriptive comment text identifying the application associated with the ghost code unit, such as "code associated with application XYZ was not transformed into HTML"; or identifying the service provider, such as "code associated with developer ABC was not transformed into HTML"). The ghost code unit may be disabled by replacing the webpage code that would otherwise be transformed from the ghost code unit with a generic comment in the webpage code (e.g., generic comment text, such as "code associated with uninstalled app was not transformed into HTML"). Combinations of the above may alternately be used.

Notably, although the ghost code units are disabled by the transforming, the ghost code units may still be identifiable within the webpage code, so that a user (e.g., the service instance owner) can be aware of and identify the ghost code unit that has been disabled. This provides transparency to the user, for example, to enable the user to manually remove the ghost code unit from the template file if desired, or to enable the user to identify a possible reason for an error in the webpage.

In other applications, the HTML transform module 522 may be configured to disable the ghost code unit by simply removing it from the webpage code entirely, i.e. not transforming the ghost code units into webpage code or HTML at all. In any case, the ghost code unit continues to remain in the template file 504.

The HTML transform module 522 is further configured to provide the webpage file to a user or customer device 150 and the webpage file is then rendered into a webpage by the web browser engine 154 on the customer device 150 in the usual manner.

Because the webpage file that is provided by the HTML transform module 522 to a user or customer device 150 has been created with disabled ghost code units (i.e. any webpage code that would normally correspond to the ghost code units is absent from the webpage file, or that the ghost code units are transformed into non-functioning webpage code), the web browser engine 154 only renders the present and functioning webpage code. The web browser engine 154 does not render the webpage code that would otherwise have been transformed from ghost code units. This reduced rendering helps reduce the amount of computer resources (e.g. processor power and memory) consumed, as well as reducing the amount of time required for the web browser engine 154 to render the webpage.

Optionally, the template rendering engine 520 may be configured to monitor all instances of when a given code unit is disabled. When the monitored instances satisfy a predetermined rule, such as passing a defined threshold, the template rendering engine 520 may generate a notification and send the notification to a user device (such as merchant device 102) that is associated with the service instance 502, where the notification identifies the given code unit. The notification may also indicate that the given code unit has been disabled, and/or the number of times the given code unit has been disabled during transformation into the webpage code. The notification may further include a selectable option for automatically removing the given code unit from the template file. This may help to automate the process of cleaning up ghost code units from the template file 504, while at the same time providing transparency to the user associated with the service instance 502. Further, because the selectable option to remove the ghost code unit is provided after a predetermined rule (such as the ghost code unit being disabled for at least a predefined number of times, or being disabled for at least a predefined period of time), there is greater confidence that the code unit that has been identified as a ghost code unit actually is not needed and can be safely removed from the template file without negatively affecting rendering of a webpage.

Figure 6:
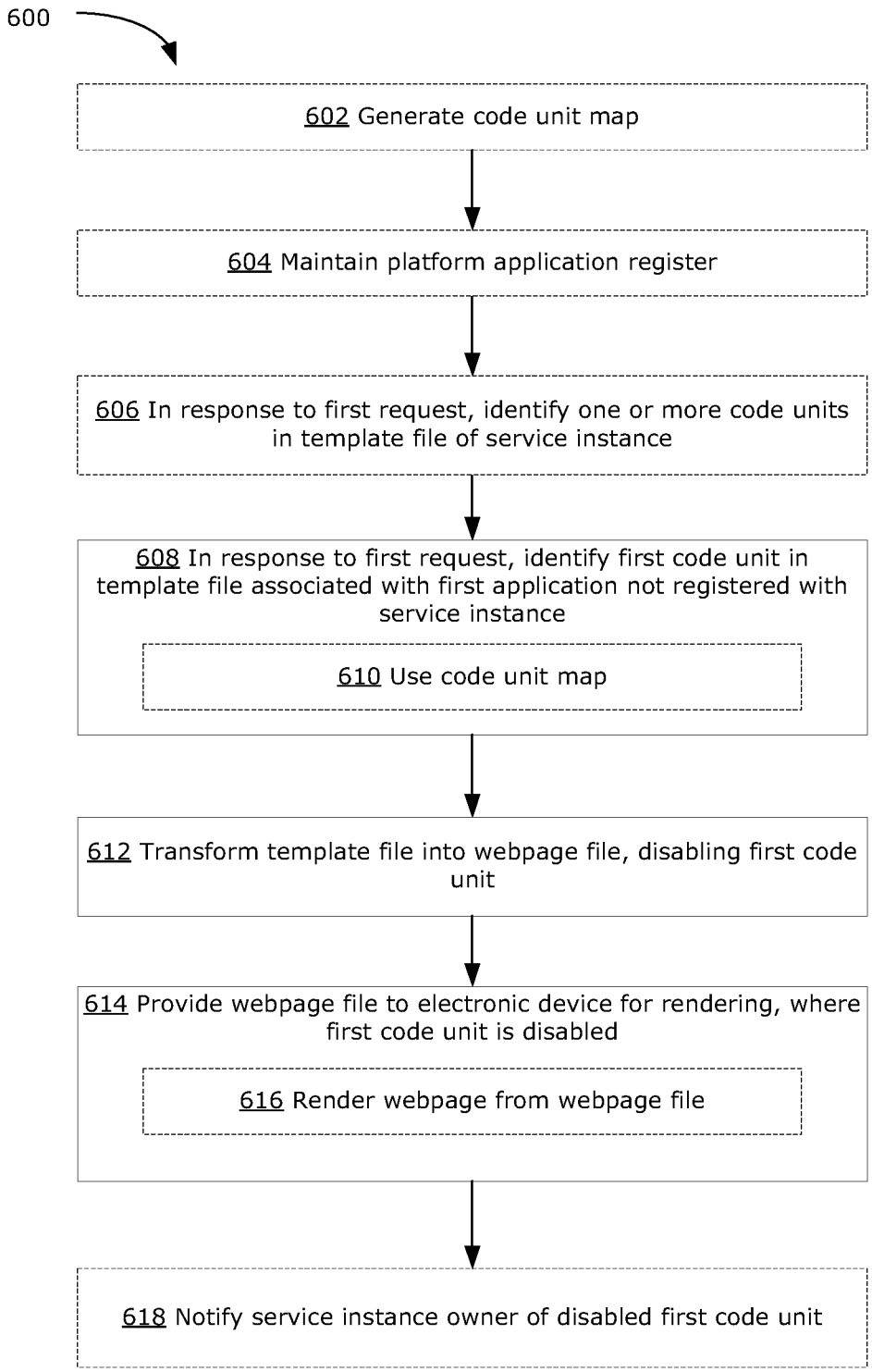
FIG. 6 is a flowchart illustrating an example method for identifying and disabling code units in template code of service instances.

FIG. 6 is a flowchart illustrating an example method 600 for dynamically disabling a code unit of template code when rendering a webpage. The example method 600 may be performed by the e-commerce platform 100 using the code unit identification module 550 and code unit map module 552, for example. In particular, the method 600 may be performed in real-time (or near real-time) when a user or customer device 150 requests rendering of a webpage.

At an operation 602, the code unit map 558 may be generated. The code unit map 558 contains entries associating code units with their related applications and the applications' third-party service providers.

In one embodiment, the code unit map module 552 may generate the code unit map 558 using the map generation engine 554. To generate the code unit map 558, applications may be installed in an isolated test or "sandbox" environment. Operation 602 then involves observing how the code in a test template file is affected. Sets of code units that are associated with the applications (based on how code in a test template file is affected by installation of the applications) may be identified, and entries in the code unit map 558 may be generated. As such, each time an application is requested to be added to the platform application register 512, one or more code units associated with the new application may be identified, and the code unit map 558 may be updated to include any new entries.

In other embodiments, the code unit map 558 may be generated by analyzing all (or a sampling of) service instances on the associated platform (such as e-commerce platform 100) to correlate or identify inserted code units in template files 504 of the service instances 502 with respective historical records of the application installations for each service instance 502 (from the service instance application register 516). To that end, operation 602 may include parsing a plurality of template files 504 associated with a plurality of service instances 502, to identify sets of code units that are associated with the service instances 502. Operation 602 may then include determining which installed applications are associated with those service instances 502, and determining, based on correlation between the sets of code units and the sets of installed applications associated with those service instances 502, associations between identified code units and the correspondingly installed applications. Such associations may be decided based on a predetermined statistical threshold. For the determined associations, entries may be generated in the code unit map 558 that identify the identified code units that are associated with the installed applications.

Optionally, at an operation 604, the method 600 may include maintaining a platform application register 512 of applications that are installable by the service instances 502. In such an embodiment, if a new application is requested to be added to the platform application register 512, a code unit associated with the second application may be identified using the isolated test environment, as described above. The code unit map 558 may then be updated to include an entry that identifies the identified code unit that is associated with the new application. The platform application register 512 may also be updated with the new application.

Then, at an operation 606, in response to a first request (e.g., received from a user or customer device 150) to render a webpage from a template file 504 associated with a service instance 502, one or more code units may be identified in the template file 504. Code units may be identifiable by unique strings (such as "include" instruction, "render" tag, ".liquid" extension etc.) In some cases, each code unit may be stored in a separate file.

At an operation 608, also in response to the first request, a first code unit is identified (possibly from the one or more code units) from the template file as a ghost code unit. In that regard, the first code unit may be associated with a first application that is not included in a set of one or more installed applications registered with the service instance 502 (as indicated by the service instance application register 516). In the embodiment depicted in FIG. 6, the first code unit may be identified using the code unit map 558 at an operation 610. As noted above, the code unit map 558 contains entries associating code units with their related applications and the applications' third-party service providers. The service instance application register 516 contains a list of applications currently registered against the particular service instance 502.

Thus, for a given code unit, referencing the code unit map 558 would indicate which application is associated with the given code unit. Operation 608 may then involve cross-referencing this information with the service instance application register 516 of the particular service instance 502, to determine whether the application associated with the given code unit is installed or registered against the particular service instance 502. If it is, then the given code unit is not a ghost code unit, since the given code unit is required by the correspondingly installed application. If the corresponding application is not registered against the particular service instance 502, then the given code unit may be identified as a ghost code unit.

For example, referring to FIG. 8, if a template file 504 of a service instance 502 has Code Unit B, the code unit map 558 indicates that Code Unit B is associated with Application Y which is provided by Service Provider 1. If Application Y is registered against that service instance 502 (according to its service instance application register 516), then Code Unit B is not determined to be a ghost code unit. However, if Application Y is not registered against that service instance 502, then Code Unit B is may be a ghost code unit.

While a given code unit may be determined to be a ghost code unit at the application level (as described above), the given code unit may alternately or additionally be determined to be a ghost code unit at the service provider level. In such a case, for the given code unit, referencing the code unit map 558 would indicate which application is associated with the given code unit, and would indicate which third-party service provider 160 provides that application. It is known that third-party service providers may provide more than one application to the e-commerce platform 100. In such a case, if it is determined that the application (associated with the given code unit) is associated with a service provider that is associated with an installed application registered with the service instance 502, then the given code unit is not identified as a ghost code unit (since the given code unit may be required by the related installed application). If it is determined that the application (associated with the given code unit) is associated with a service provider that is not associated with any installed application registered with the service instance 502, then the given code unit is identified as a ghost code unit.

For example, referring back to FIG. 8, if a template file 504 of a service instance 502 has Code Unit B, the code unit map 558 indicates that Code Unit B is associated with Application Y which is provided by Service Provider 1. However, the code unit map 558 further indicates that Service Provide 1 also provides Application X. Thus, if Application Y is not registered against that service instance 502 (according to its service instance application register 516), but Application X is registered, then Code Unit B is not determined to be a ghost code unit, since Code Unit B may be required by Application X.

If the template file 504 of the service instance 502 has Code Unit C, the code unit map 558 indicates that Code Unit C is associated with Application Z which is provided by Service Provider 2, which also provides Application W. If the particular service instance 502 only has Application Y registered against it, and does not have either Application Z or Application W registered against it (according to its service instance application register 516), then Code Unit C is determined to be a ghost code unit.

At an operation 612, after the one or more ghost code units have been identified in the template file 504, the template file 504 is transformed into a webpage file containing webpage code (such as HTML), where the transforming disables the identified ghost code unit(s). The transformation may involve transforming the ghost code unit into non-functioning webpage code (e.g., a comment) in the webpage file, and the non-functioning webpage code is not rendered into the webpage. In some examples, the non-functioning webpage code may be a comment that includes an indication of the ghost code unit. The transformation may alternatively or additionally involve transforming the ghost code unit(s) into a generic comment that the ghost code unit was not transformed into the webpage file. The generic comment may then not be rendered on the webpage. In other applications, the transformation may simply involve not transforming the identified ghost code unit into any webpage code/HTML at all (i.e., any webpage code that would otherwise be transformed from the ghost code unit may be entirely omitted from the webpage file).

Then at an operation 614, the method 600 further includes providing the webpage file, in which the disabled ghost code unit has been disabled (i.e. having been transformed into non-functioning code in the webpage file, or not having been transformed into any corresponding webpage code in the webpage file) to an electronic device (e.g., the user or customer device 150) to cause the electronic device to render the webpage from the webpage file. At an operation 616, rendering the webpage file, thus, does not render any webpage code corresponding to the disabled ghost code unit. Because webpage code corresponding to the ghost code unit(s) are no longer unnecessarily rendered into the webpage by the web browser engine, computer resources (such as processor power and memory) are reduced, as is the time required for the webpage to be rendered. Rendering the webpage file typically involves the use of a web browser or other webpage processing engine to render the HTML or web code from the webpage file into a viewable webpage.

Optionally, at an operation 618, the owner of the service instance 502 may be notified when a ghost code in the template file 504 has been identified and disabled. For example, when a ghost code unit has been disabled during dynamic transformation for a threshold amount (such as a threshold amount of time, or a threshold number of renders, or for a threshold number of service instances), a notification may be generated and sent to the service instance owner(s) indicating the presence of the ghost code unit and that the ghost code unit likely can be removed from the template file.

The notification can identify the ghost code unit, and the application and/or service provider associated with the ghost code unit. The notification may also provide an option for the service instance owner to remove the ghost code unit from the template file 504. The owner of the service instance may then make the final decision whether or not to remove the ghost code unit. For example, the notification can include an option that, if selected, with automatically delete the ghost code unit from the template file 504, without the service instance owner having to manually identify and delete the code from the template file 504. This helps to provide transparency to the service instance owner, for example to enable the service instance owner to manually remove the ghost code unit from the template file if desired, or to enable the service instance owner to identify a possible reason for an error in the webpage (e.g., if the ghost code unit is actually necessary for proper rendering of the webpage).

Figure 7:
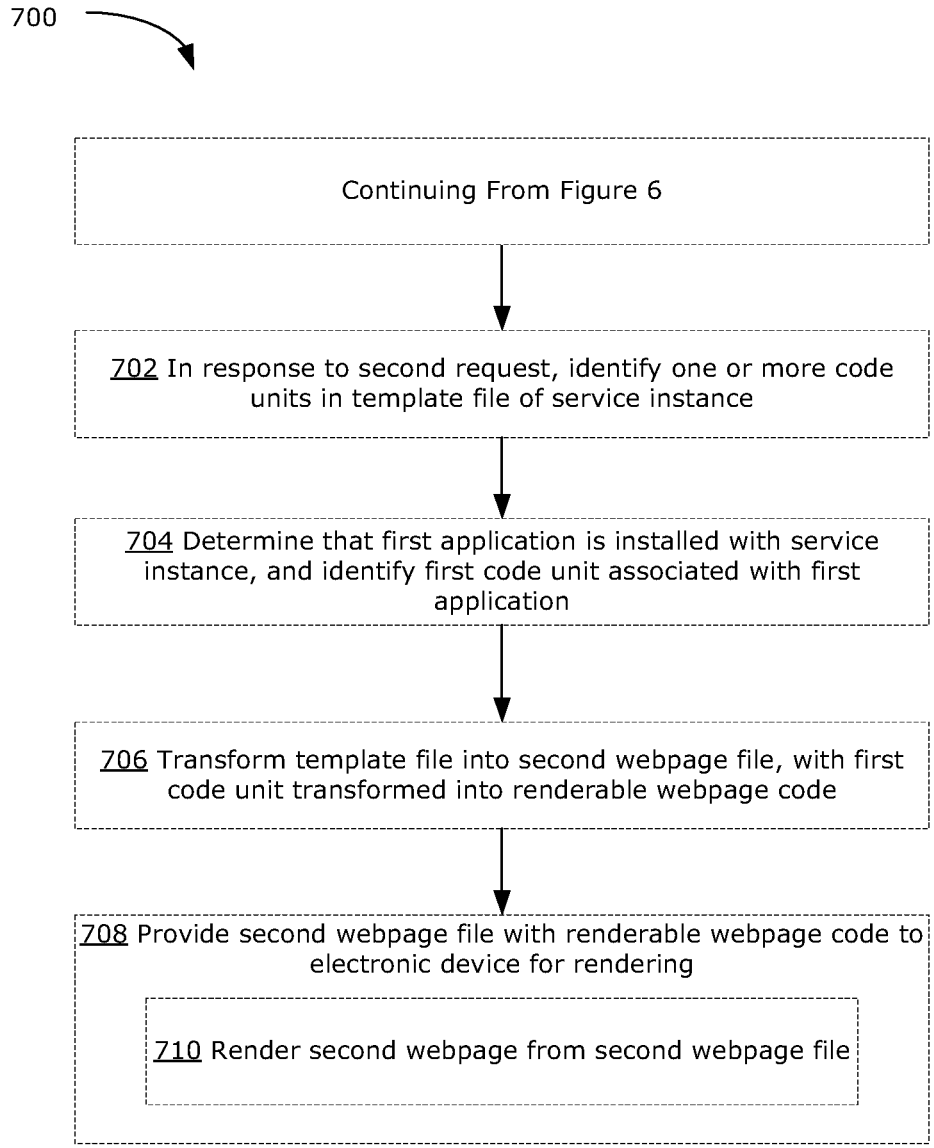
FIG. 7 is a flowchart illustrating an example method for identifying and enabling code units in template code of service instances.

FIG. 7 is a flowchart illustrating an example method 700 that may be performed following the method 600, for dynamically re-enabling disabled code units of template code when rendering a webpage. The example method 700 may be performed by the e-commerce platform 100 using the code unit identification module 550 and code unit map module 552, for example. In particular, the method 700 may be performed in real-time (or near real-time) when a user or customer requests rendering of a webpage of the service instance 502.

At an operation 702, in response to a second request (that was made subsequent to the first request received at the operation 606) to render the webpage from the template file 504, the one or more code units of the template file 504 may again be identified, including the previously identified ghost code unit in the template file 504.

However, in the time between when the first request and second request was made, the application associated with the ghost code unit may have been (re)installed or (re)registered against the service instance 502, and its service instance application register 516 has been updated to reflect this change. Thus, at an operation 704, the application associated with the ghost code unit is determined to have been (re)installed or (re)registered against the service instance 502 subsequent to the first request.

In such a case, the former ghost code unit is now identified as a functioning code unit (i.e. no longer a ghost code unit), since the given code unit is now required by the correspondingly (re)installed application.

At an operation 706, the template file is transformed or converted into a second webpage file, where the (former ghost) code unit is transformed into renderable webpage code.

At an operation 708, the second webpage file is, in a similar manner as above, provided to the electronic device to cause the electronic device to render a second webpage from the second webpage file. In this case now, at an operation 710, the second webpage file (with renderable webpage code of the former ghost code unit) is rendered into the second webpage, with the former ghost code unit now transformed into functioning webpage code and the functioning webpage code is rendered.

In this manner, when a previously uninstalled application is re-installed against a service instance 502, any ghost code unit associated with that re-installed application will automatically be recognized as being functional (i.e., no longer ghost code), because the mapping step at operation 704 will identify the code unit as being associated with an installed application. Thus, it will no longer be disabled by the template rendering engine 520 at operation 706. A similar automatic process occurs if any application associated with the service provider (that is associated with the ghost code unit) is re-installed or newly installed with the service instance 502.

Most conventional code optimization techniques focus on optimizing the source code by removing non-functional code, reducing duplicated code, etc. In contrast, the present systems and methods explicitly aim to not change or improve the source template code. In that manner, the disabling of ghost code units is temporary and reversible.

In the specific case where a ghost code unit has been identified as such, but it is not associated with any currently installed application and/or service provider, but needs to be enabled nonetheless (for example, the ghost code unit is relied on by other hard-coded functions in the template file 504) there are different ways to enable the ghost code unit. The code unit map 558 may be updated with a flag or other indicator to always enable the ghost code unit. This would enable the ghost code unit across all template files 504 used by all service instances 502.

Alternately, or additionally, a flag or other indicator can be inserted into a specific template file 504 (such as a header, or right before the ghost code unit) to indicate the ghost code unit should be enabled for that specific template file 504. This would require directly editing the template file 504, which may be performed automatically (e.g., by the code unit identification module 550) in response to selection of an option (which may be provided in a notification identifying a ghost code unit) by a service instance owner to never disable an identified ghost code unit. A hybrid of the two methods may also be employed, where the code unit map 558 could be updated (or potentially stored in a separate map) to indicate that a particular code unit for a particular service instance 502 should not be disabled during the transformation steps of the template file 504 into the webpage file.

In addition to the applications noted above, aside from identifying and disabling ghost code units, the present disclosure may similarly apply to identifying and disabling broken or vulnerable code units.

For example, if it is known that a certain application or service provider has been compromised, the present systems and methods may be used to disable all code units associated with the compromised application or service provider, until the vulnerability has been addressed by the service provider. The present systems and methods provide the benefit of protecting service instances from the vulnerability, and at the same time, allowing the template code to be easily enabled again when the vulnerability has been patched.

As well, the present systems and methods may be applicable to any unstructured coding environment (i.e., where there is no version control system).

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising:
a processing unit configured to execute instructions to cause the system to:
in response to a first request to render a webpage from a template file associated with a service instance, identify a first code unit in the template file that is associated with a first application that is not included in a set of one or more installed applications registered with the service instance;
generate a webpage file from the template file, the webpage file containing webpage code, wherein the generating disables the first code unit in the webpage file and maintains the first code unit in the template file; and
providing the webpage file to an electronic device to cause the electronic device to render the webpage from the webpage file wherein the first code unit has been disabled.

2. The system of claim 1, wherein the processing unit is further configured to execute the instructions to cause the system to parse the template code contained in the template file to identify one or more code units in the template file, the first code unit being further identified from the one or more code units.

3. The system of claim 1, wherein the processing unit is further configured to execute the instructions to cause the system to identify the first code unit using a code unit map.

4. The system of claim 3, wherein identifying the first code unit further comprises determining, using the code unit map, that the first application is associated with a service provider that is not associated with any installed application registered with the service instance.

5. The system of claim 3, wherein the processing unit is further configured to execute the instructions to cause the system to:
maintain a platform application register of installable applications;
in response to a request to add a second application to the platform application register, identify a second code unit associated with the second application;
update the code unit map to include an entry including identification of the second code unit in association with the second application; and
update the platform application register with the second application.

6. The system of claim 3, wherein the processing unit is further configured to execute instructions to cause the system to:
generate the code unit map by:
parsing a plurality of template files associated with a respective plurality of service instances, to identify sets of code units associated with service instances;
determine sets of installed applications associated with service instances;
determine, based on correlation between the sets of code units and the sets of installed applications associated with the service instances, associations between identified code units and installed applications; and
for the determined associations, generate entries in the code unit map identifying the identified code units associated with the installed applications.

7. The system of claim 6, wherein the code unit map is further generated by:
identifying code units with a low correlation with the sets of installed applications associated with the service instances; and
generating entries in the code unit map identifying the code units with low correlation with the installed applications.

8. The system of claim 3, wherein the processing unit is further configured to execute instructions to cause the system to:
generate the code unit map by:
installing applications in an isolated test environment;
identifying sets of code units associated with the applications based on how code in a test template file is affected by installation of the applications; and
generating entries in the code unit map identifying the identified code units associated with the installed applications.

9. The system of claim 1, wherein the processing unit is further configured to execute the instructions to cause the system to generate the webpage file by at least one of:
generating the webpage file to include non-functioning webpage code corresponding to the first code unit; or generating the webpage file to omit any webpage code corresponding to the first code unit.

10. The system of claim 9, wherein the processing unit is further configured to execute the instructions to cause the system to generate the webpage file to include the non-functioning webpage code by at least one of:
generating the webpage file to include a comment including an indication of the first code unit, wherein the comment is not rendered into the webpage; or
generating the webpage file to include a generic comment that the first code unit was not included in the webpage file, wherein the generic comment is not rendered on the webpage.

11. The system of claim 10, wherein the indication of the first code unit is one or more of an explicit identification of the first code unit, an identification of the associated application, and an identification of the associated service provider.

12. The system of claim 1, wherein the processing unit is further configured to execute the instructions to cause the system to:
in response to a second request, subsequent to the first request, to render the webpage from the template file, identify the first code unit in the template file;
determine, using the code unit map, that the first code unit is associated with the first application, and further determining that the first application has been installed with the service instance subsequent to the first request;
generate a second webpage file from the template file, wherein the second webpage file is generated to include renderable webpage code associated with the first code unit; and
providing the second webpage file to the electronic device to cause the electronic device to render a second webpage from the second webpage file, including rendering the webpage code associated with the first code unit.

13. A method comprising:
in response to a first request to render a webpage from a template file associated with a service instance, identifying a first code unit in the template file that is associated with a first application that is not included in a set of one or more installed applications registered with the service instance;
generating a webpage file from the template file, the webpage file containing webpage code, the generating disabling the first code unit in the webpage file and maintaining the first code unit in the template file; and
providing the webpage file to an electronic device to cause the electronic device to render the webpage from the webpage file, wherein the first code unit is disabled.

14. The method of claim 13, wherein the first code unit is identified using a code unit map.

15. The method of claim 14, wherein identifying the first code unit further comprises determining, using the code unit map, that the first application is associated with a service provider that is not associated with any installed application registered with the service instance.

16. The method of claim 13, further comprising:
maintaining a platform application register of installable applications;
in response to a request to add a second application to the platform application register, identifying a second code unit associated with the second application;
updating the code unit map to include an entry including identification of the second code unit in association with the second application; and
updating the platform application register with the second application.

17. The method of claim 14, further comprising generating the code unit map by:
parsing a plurality of template files associated with a respective plurality of service instances, to identify sets of code units associated with service instances;
determining sets of installed applications associated with service instances;
determining, based on correlation between the sets of code units and the sets of installed applications associated with the service instances, associations between identified code units and installed applications; and
for the determined associations, generating entries in the code unit map identifying the identified code units associated with the installed applications.

18. The method of claim 14, further comprising generating the code unit map by:
installing applications in an isolated test environment;
identifying sets of code units associated with the applications based on how code in a test template file is affected by installation of the applications; and
generating entries in the code unit map identifying the identified code units associated with the installed applications.

19. The method of claim 13, wherein the webpage file is generated by at least one of:
generating the webpage file to include non-functioning webpage code corresponding to the first code unit; or
generating the webpage file to omit any webpage code corresponding to the first code unit.

20. The method of claim 19, wherein generating the webpage file to include the non-functioning webpage code comprises at least one of:
generating the webpage file to include a comment including an indication of the first code unit, wherein the comment is not rendered into the webpage; or
generating the webpage file to include a generic comment that the first code unit was not included in the webpage file, wherein the generic comment is not rendered on the webpage.

21. The method of claim 13, further comprising:
in response to a second request, subsequent to the first request, to render the webpage from the template file, identify the first code unit in the template file;
determining that the first code unit is associated with the first application, and further determining that the first application has been installed with the service instance subsequent to the first request;
generating a second webpage file from the template file, wherein the second webpage file is generated to include renderable webpage code associated with the first code unit; and
providing the second webpage file to the electronic device to cause the electronic device to render a second webpage from the second webpage file, including rendering the webpage code associated with the first code unit.

22. A non-transitory computer-readable medium storing instructions that, when executed by a processor of a system, causes the system to:
in response to a first request to render a webpage from a template file associated with a service instance,
identify a first code unit in the template file that is associated with a first application that is not included in a set of one or more installed applications registered with the service instance;

generate a webpage file from the template file, the webpage file containing webpage code, wherein the generating disables the first code unit in the webpage file and maintains the first code unit in the template file; and provide the webpage file to an electronic device to cause the electronic device to render the webpage from the webpage file, wherein the first code unit has been disabled.

* * * * *